(12) United States Patent
Hyodo et al.

(10) Patent No.: US 10,767,342 B2
(45) Date of Patent: Sep. 8, 2020

(54) WORK VEHICLE

(71) Applicant: Hitachi Construction Machinery Co., Ltd., Taito-ku, Tokyo (JP)

(72) Inventors: Koji Hyodo, Ibaraki (JP); Isamu Aoki, Ibaraki (JP); Tetsuji Tanaka, Chiba (JP); Koji Shimazaki, Hyogo (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 16/489,795

(22) PCT Filed: Sep. 4, 2018

(86) PCT No.: PCT/JP2018/032782
§ 371 (c)(1),
(2) Date: Aug. 29, 2019

(87) PCT Pub. No.: WO2019/065121
PCT Pub. Date: Apr. 4, 2019

(65) Prior Publication Data
US 2020/0011025 A1 Jan. 9, 2020

(30) Foreign Application Priority Data
Sep. 26, 2017 (JP) .................. 2017-185409

(51) Int. Cl.
*E02F 9/00* (2006.01)
*B60K 11/04* (2006.01)
(Continued)

(52) U.S. Cl.
CPC ............. *E02F 9/003* (2013.01); *B60K 11/04* (2013.01); *B60L 2200/40* (2013.01);
(Continued)

(58) Field of Classification Search
CPC ............. F02D 19/0684; F02D 19/0673; F02M 21/0245; F02M 43/00; F02M 43/02;
(Continued)

(56) References Cited

U.S. PATENT DOCUMENTS 6,076,488 A * 6/2000 Yamagishi ............... F01P 5/043
123/41.12
6,349,882 B1 * 2/2002 Kita ........................ F01P 7/044
236/34

(Continued)

FOREIGN PATENT DOCUMENTS

JP   10-68142 A    3/1998
JP   11-193719 A   7/1999
(Continued)

OTHER PUBLICATIONS

International Search Report (PCT/ISA/210) issued in PCT Application No. PCT/JP2018/032782 dated Nov. 27, 2018 with English translation (five pages).

(Continued)

*Primary Examiner* — Hung Q Nguyen
(74) *Attorney, Agent, or Firm* — Crowell & Moring LLP

(57) ABSTRACT

The work vehicle includes an engine, a radiator; a hydraulic pump; a cooling fan that blows a cooling air to the radiator; a hydraulic motor which is driven by a pressure oil delivered from the hydraulic pump, and rotates the cooling fan; a directional control valve that switches a flow direction of the pressure oil from the hydraulic pump to rotate the hydraulic motor in forward and reverse directions; and a controller that controls the directional control valve so as to cause the repetitive operation of the forward and reverse rotation of the cooling fan to be performed at predetermined time intervals, in which the controller reduces the time intervals more than a normal time initially set when a relationship between the outside air temperature detected by the outside (Continued)

air temperature sensor and the refrigerant temperature detected by the refrigerant temperature sensor satisfies a predetermined condition.

6 Claims, 4 Drawing Sheets

(51) Int. Cl.
  *E02F 9/22* (2006.01)
  *F01P 11/14* (2006.01)
(52) U.S. Cl.
  CPC .............. *E02F 9/2264* (2013.01); *F01P 11/14* (2013.01); *F01P 2025/08* (2013.01)
(58) Field of Classification Search
  CPC ................ F02M 63/0028; F02M 43/04; F02M 21/0248; F02M 21/023; F02M 37/0023; F02M 47/02; Y02T 10/36; Y02T 10/32
  See application file for complete search history.

(56) References Cited

U.S. PATENT DOCUMENTS

| | | | |
|---|---|---|---|
| 9,026,255 | B2 | 5/2015 | Turnis et al. |
| 2009/0217655 | A1* | 9/2009 | Yabuki ................... F01P 7/044 60/456 |

FOREIGN PATENT DOCUMENTS

| | | |
|---|---|---|
| JP | 11-241615 A | 9/1999 |
| JP | 2009-24592 A | 2/2009 |
| JP | 4825006 B2 | 11/2011 |

OTHER PUBLICATIONS

Japanese-language Written Opinion (PCT/ISA/237) issued in PCT Application No. PCT/JP2018/032782 dated Nov. 27, 2018 (four pages).

* cited by examiner

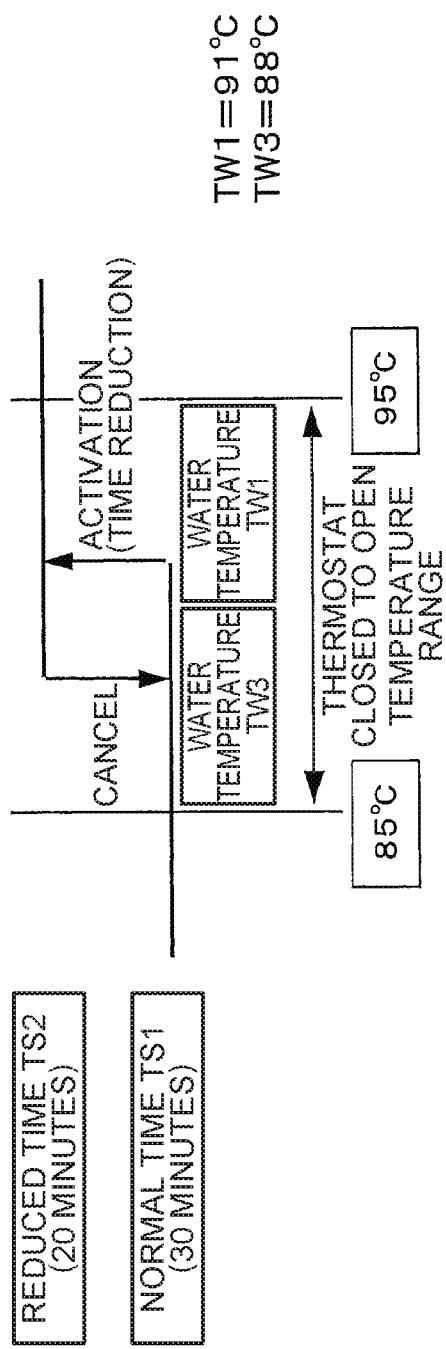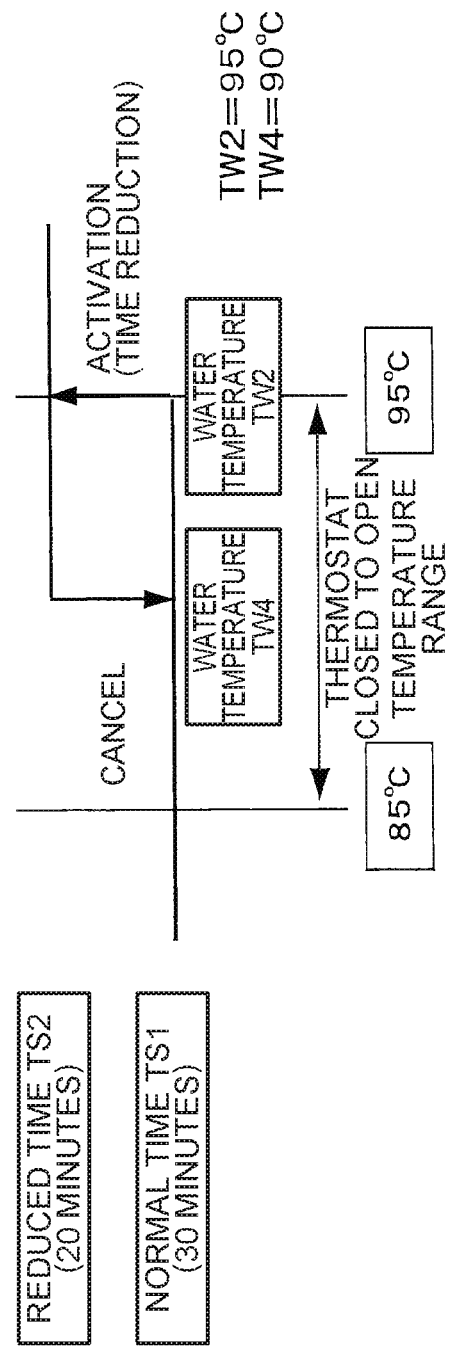

WORK VEHICLE

TECHNICAL FIELD

The present invention relates to a work vehicle such as a hydraulic excavator and a wheel loader.

BACKGROUND ART

In order to cool a coolant water (refrigerant) for an engine of a work vehicle such as a hydraulic excavator or a wheel loader, a radiator and a cooling fan for blowing a cooling air (outside air) to the radiator are mounted on the work vehicle. The cooling fan is driven by a hydraulic motor which is driven independently of the engine, and the cooling air can be sent to the radiator by rotating the cooling fan. In such a cooling fan, if the air blowing direction is one direction, dust is sent to the radiator together with the cooling air to cause clogging. Therefore, a cooling fan control device has been proposed in which the dust that has been trapped in the radiator during forward rotation is removed by a reverse flow of the cooling air generated by the reverse rotation by controlling the drive of the cooling fan in forward and reverse rotation (refer to Patent Literature 1).

The cooling fan control device disclosed in Patent Literature 1 has an automatic mode in which a rotational direction of the cooling fan is automatically switched at predetermined time intervals, and a manual mode in which the rotational direction of the cooling fan is switched at an arbitrary timing by an operator. An upper limit to the rotational speed of the engine is set only when the forward and reverse rotation of the cooling fan is controlled manually by the operator so that a large load is not exerted on the hydraulic motor, the valve, and so on configuring a hydraulic circuit.

CITATION LIST

Patent Literature

Patent Literature 1: Japanese Patent No. 4825006

SUMMARY OF INVENTION

Technical Problem

In the cooling fan control device disclosed in Patent Literature 1, when the automatic mode is set, the rotation direction of the cooling fan is automatically switched every predetermined time, so that dust that has clogged the radiator during the forward rotation of the cooling fan can be removed by reverse rotation. However, since the switching operation of the forward and reverse rotation of the cooling fan is repeatedly performed at the predetermined time intervals (for example, every 30 minutes), the radiator may be clogged before the cooling fan is reversely rotated. In that case, there is a possibility that a problem such as the overheat of the engine occurs since an enough cooling capacity can be no longer exerted.

It should be noted that if the interval time for forward and reverse rotation of the cooling fan is set short beforehand (for example, every 15 minutes), it becomes easy to remove dust by backflow of the cooling air before the radiator is clogged. However, a pressure in a hydraulic circuit rapidly rises during reverse operation of the cooling fan in which forward and reverse rotation occurs, and an excessive load is applied to the hydraulic motor and the valve that configure the hydraulic circuit, so that if the number of times the forward and reverse rotation of the cooling fan is performed within an operating time increases, another problem will occur that the life of parts such as the hydraulic motor and the valve will be shortened.

The present invention has been made from the circumstances of the prior art as described above, and an object of the present invention is to provide a work vehicle capable of improving the durability of a hydraulic pump or the like configuring a hydraulic circuit while being able to appropriately remove clogging of a radiator.

Solution to Problem

In order to achieve the above object, there is provided a work vehicle comprising: an engine, a radiator that cools a refrigerant of the engine; a hydraulic pump that is driven by the engine; a refrigerant temperature sensor that detects a temperature of the refrigerant; an outside air temperature sensor that detects a temperature of an outside air; a thermostat that opens and closes a flowpath between a fully closed state and a fully opened state in accordance with the temperature of the refrigerant on the flowpath for supplying the refrigerant to the radiator; a hydraulic motor which is driven by a pressure oil delivered from the hydraulic pump, and rotates a cooling fan for blowing a cooling air to the radiator; a directional control valve that switches the flow direction of the pressure oil from the hydraulic pump to rotate the hydraulic motor in forward and reverse directions; and a control device that controls the directional control valve to cause the repetitive operation of the forward and reverse rotation of the cooling fan to be performed at predetermined time intervals, wherein the control device changes setting of the time intervals when a relationship between the outside air temperature detected by the outside air temperature sensor and the refrigerant temperature detected by the refrigerant temperature sensor satisfies a predetermined condition defined in advance.

Advantageous Effects of Invention

According to the work vehicle of the present invention, the clogging of the radiator can be appropriately removed, and the durability of the hydraulic pump and the like configuring the hydraulic circuit can be improved. Other problems, configurations, and effects except for those described above will be apparent from the following description of embodiments.

BRIEF DESCRIPTION OF DRAWINGS

FIGS. 3A and 3B are timing charts showing a relationship between a time interval during which the forward and reverse operation of a cooling fan is performed and a coolant temperature.

DESCRIPTION OF EMBODIMENT

Hereinafter, embodiments of the present invention will be described with reference to FIGS. 1 to 4.

Figure 1:
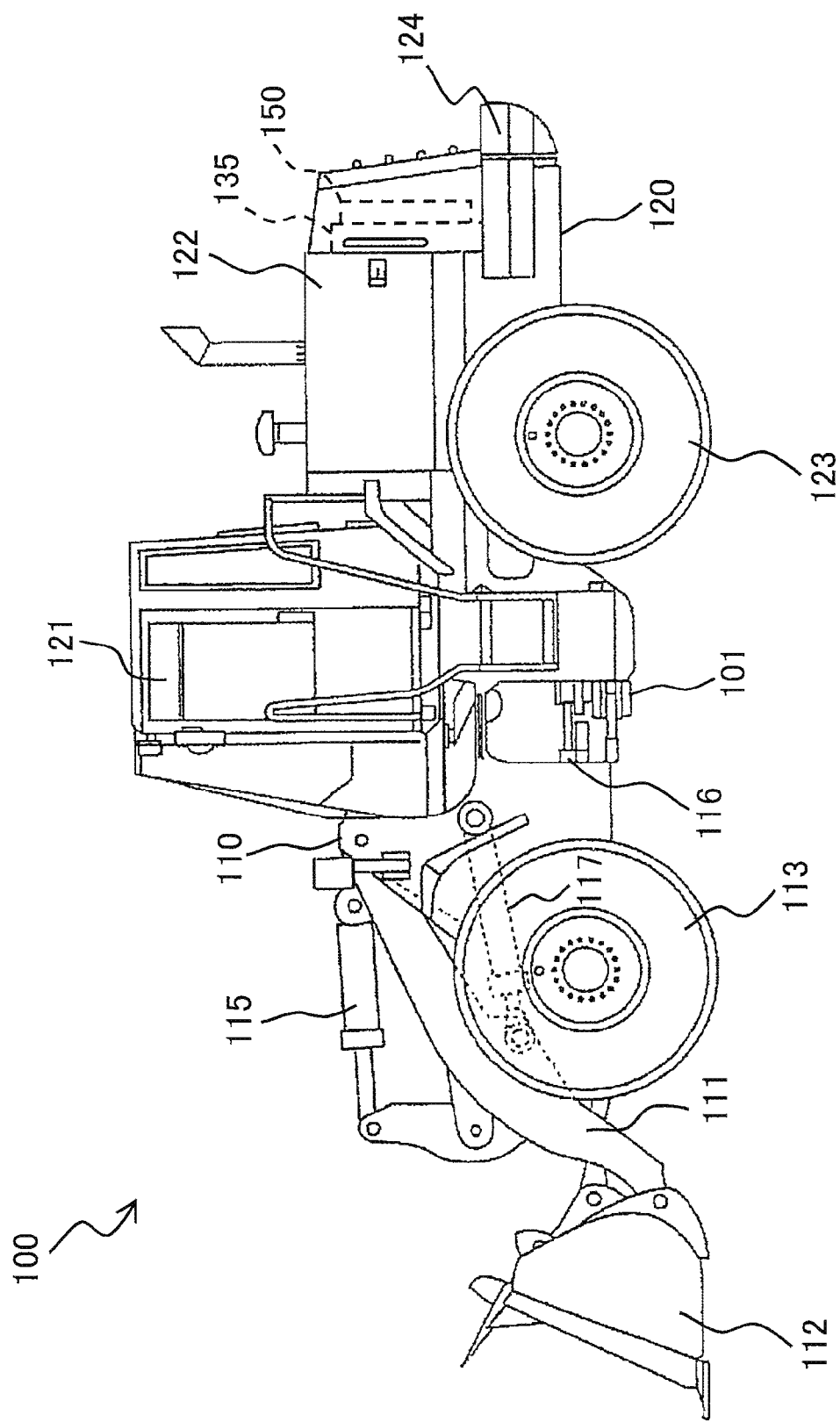
FIG. 1 is a side view showing a wheel loader as an example of a work vehicle according to the present invention.

FIG. 1 is a side view of a wheel loader 100 which is an example of a work vehicle according to the present invention. As shown in FIG. 1, the wheel loader 100 includes a front frame 110 having an arm 111, a bucket 112, tires 113, and the like, and a rear frame 120 having a cab 121, an engine compartment 122, tires 123 and the like. An engine (not shown) is mounted in the engine compartment 122, and a counterweight 124 is attached to a rear of the rear frame 120.

The arm 111 is rotated (elevation moved) in a vertical direction by driving an arm cylinder 117, the bucket 112 is vertically rotated (clouded or dumped) by driving a bucket cylinder 115. The arm 111 and the arm cylinder 117 are provided as a pair on the left and right. The front frame 110 and the rear frame 120 are pivotably connected to each other by a center pin 101, and the front frame 110 is refracted to the left and right with respect to the rear frame 120 by the expansion and contraction of a steering cylinder 116.

A radiator frame 135 and a cooling fan unit 150 are provided behind the engine compartment 122. The radiator frame 135 is fixed to the rear frame 120, and the radiator frame 135 is attached with a radiator 8 for cooling a coolant water (refrigerant) of the engine 1 and an oil cooler 9 for cooling a hydraulic oil shown in FIG. 2 to be described later. The cooling fan unit 150 is disposed at the rear of the radiator frame 135, and the cooling fan unit 150 includes a cooling fan 4 driven by the hydraulic motor 3 shown in FIG. 2 to be described later.

Figure 2:
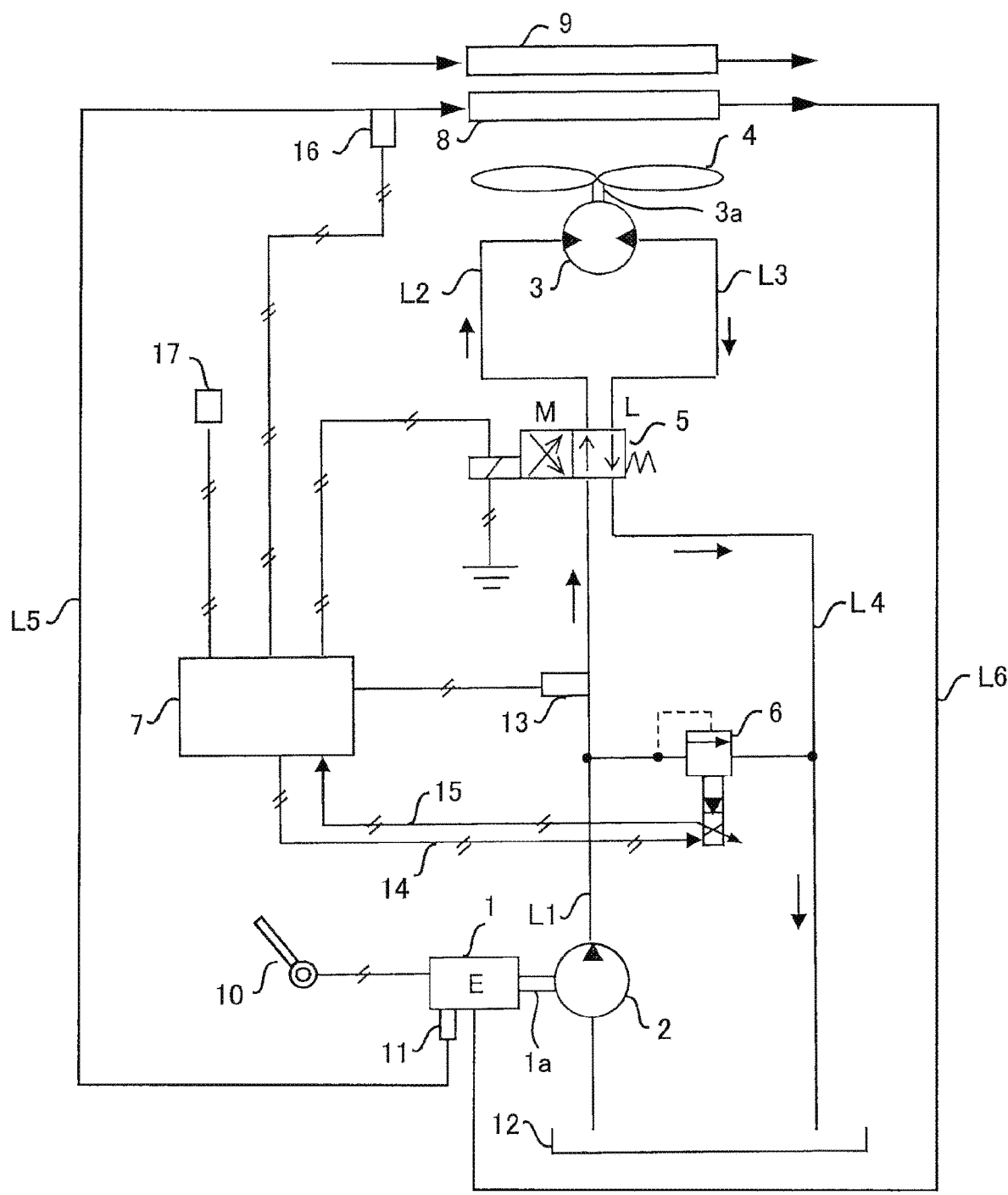
FIG. 2 is a configuration diagram of a hydraulic circuit of the working vehicle according to an embodiment of the present invention.

As shown in FIG. 2, a hydraulic circuit including the engine 1 and a cooling fan control device is mounted on the rear frame 120. The hydraulic circuit includes the engine 1, a hydraulic pump 2 driven by the engine 1, a hydraulic motor 3 driven by a pressure oil delivered from the hydraulic pump 2, the cooling fan 4 rotated by the hydraulic motor 3, a directional control valve 5 that switches a flow direction of the pressure oil from the hydraulic pump 2 to rotate the cooling fan 4 in forward and reverse directions, a variable relief valve 6 for adjusting a rotational speed of the hydraulic motor 3, a controller 7 (control device) that controls the directional control valve 5 and the variable relief valve 6, and so on. The hydraulic motor 3 rotates the cooling fan 4 for blowing a cooling air (outside air) to the radiator 8 and the oil cooler 9.

The rotational speed of the engine 1 increases with an increase in a manipulated variable (depression amount) of an accelerator pedal 10 disposed in the driver's cab 121, and when the engine rotational speed increases, the rotational speed of the hydraulic pump 2 increases and the pump discharge amount increases.

A thermostat 11 is provided in a flow path L5 connecting between the engine 1 and the radiator 8, and the coolant water raised by the heat of the engine 1 flows into the radiator 8 through the flow path L5 in which the thermostat 11 is interposed, and the coolant water returns again to the engine 1 through a conduit L6 after having been cooled by the radiator 8. The thermostat 11 opens and closes a flowpath from a fully closed state to a fully open state according to the temperature of the coolant water on the flow path L5 for supplying the coolant water from the engine 1 to the radiator 8.

The thermostat 11 as used in the present embodiment is 85° C. in a fully closed temperature where the opening degree is 0%, and is 95° C. in a fully open temperature where the opening degree is 100%. In other words, the thermostat 11 is fully closed until the temperature of the coolant water which comes in contact with the thermostat 11 is 85° C. When the temperature of the coolant water exceeds 85° C., the thermostat 11 starts to open gradually and the opening area increases, and when the temperature of the coolant water reaches 95° C., the thermostat 11 is fully opened.

Although not shown, a hydraulic pump for work driven by the engine 1 is provided separately from the hydraulic pump 2 for fan rotation, and the hydraulic oil is pumped and delivered from a tank 12 by the hydraulic pump and discharged. Then, the hydraulic oil flows into the oil cooler 9 through the control valve, and cooled by the oil cooler 9, and then again returns to the tank 12.

The engine 1 and the hydraulic pump 2 are connected to each other through an output shaft 1a of the engine 1, and the hydraulic pump 2 is driven by the engine 1. The directional control valve 5 is provided between the hydraulic pump 2 and the hydraulic motor 3, and the hydraulic pump 2 and the directional control valve 5 are connected to each other by a conduit L1. The directional control valve 5 and the hydraulic motor 3 are connected to each other by conduits L2 and L3, and a pipe L4 is provided between the directional control valve 5 and the tank 12. The hydraulic motor 3 and the cooling fan 4 are connected to each other through an output shaft 3a of the hydraulic motor 3, and the cooling fan 4 is rotated by the hydraulic motor 3.

When the pressure oil delivered from the hydraulic pump 2 is supplied to the hydraulic motor 3, the hydraulic motor 3 and the cooling fan 4 rotate, and the oil supplied to the hydraulic motor 3 returns to the tank 12. When the cooling fan 4 rotates, the cooling air is blown from the cooling fan 4 toward the radiator 8 and the oil cooler 9, and the engine coolant water and the hydraulic oil are cooled by a heat exchange with the cooling air. A dustproof filter (not shown) is provided on a surface of the radiator 8 facing the cooling fan 4.

The directional control valve 5 is an electromagnetic type selector valve, and switches to an L position (forward rotation side) or an M position (reverse rotation side) according to a control signal from the controller 7. When the directional control valve 5 is at the L position (forward rotation side), the pressure oil from the hydraulic pump 2 is supplied to the hydraulic motor 3 through the conduits L1 and L2, and the hydraulic motor 3 and the cooling fan 4 rotate in the forward direction. The oil supplied to the hydraulic motor 3 returns to the tank 12 through the conduits L3 and L4. When the directional control valve 5 is switched to the M position (reverse rotation side), the pressure oil from the hydraulic pump 2 is supplied to the hydraulic motor 3 through the conduits L1 and L3, and the hydraulic motor 3 and the cooling fan 4 rotate in the reverse direction. The oil supplied to the hydraulic motor 3 returns to the tank 12 through the conduits L2 and L4.

The variable relief valve 6 is an electromagnetic type variable relief valve, and is interposed between the conduit L1 and the conduit L4. A pressure sensor 13 for detecting a discharge side pressure is provided in the conduit L1 of the discharge side of the hydraulic pump 2 and information of the discharge side pressure detected by the pressure sensor 13 is input to the controller 7.

The controller 7 is configured to include an arithmetic processing unit having a storage device such as a CPU, a ROM, and a RAM, and other peripheral circuits. The controller 7 is connected to the variable relief valve 6 through a control line 14, and the variable relief valve 6 defines a highest pressure of the pressure oil supplied from the hydraulic pump 2 to the hydraulic motor 3 in accordance with the output current value (instruction value) from the controller 7 to control the discharge side pressure of the hydraulic pump 2. The controller 7 controls the setting relief pressure of the variable relief valve 6, in other words, controls the discharge side pressure of the hydraulic pump 2 as an inlet side pressure of the hydraulic motor 3, thereby being capable of controlling the rotation speed of the cooling fan 4. Further, the variable relief valve 6 is connected to the controller 7 through a control line 15, and the controller 7 detects a feedback current value from the variable relief valve 6.

Information on the coolant temperature from the coolant temperature sensor 16 and information on the outside air temperature from the outside air temperature sensor 17 are input to the controller 7. The coolant temperature sensor 16 is a sensor for detecting the temperature of the coolant water, and is provided on a conduit or the like on the upstream side of the radiator 8. The outside air temperature sensor 17 is a sensor that detects the temperature of the outside air, and is provided at a predetermined position on an outer surface of a vehicle body which comes in contact with the outside air.

The controller 7 controls the directional control valve 5 so that the forward and reverse rotation of the cooling fan 4 is repeatedly performed at predetermined time intervals in order to remove dust that has clogged the dustproof filter of the radiator 8.

FIG. 3 is a timing chart showing a relationship between an interval time at which the rotational directions of the cooling fan 4 are switched between forward and reverse rotation and the temperature of the coolant water detected by the coolant temperature sensor 16. The storage device of the controller 7 stores a table in which an outside air temperature TA detected from the outside air temperature sensor 17, a coolant temperature TW detected from the coolant temperature sensor 16, and an interval time TS during which the forward and reverse operation of the cooling fan 4 is performed, are associated with each other. Although details will be described later, based on the above table, the controller 7 changes the interval time TS1 to any one of a normal time TS and a reduced time TS2, when the outside air temperature TA and the coolant temperature TW satisfy a predetermined condition set in advance.

The controller 7 selects one of a table shown in FIG. 3A and a table shown in FIG. 3B according to the outside air temperature TA detected by the outside air temperature sensor 17, and sets the interval time TS to any one of the normal time TS1 and the reduced time TS2 according to the coolant temperature TW detected by the coolant temperature sensor 16 with reference to the selected table.

The table shown in FIG. 3A is selected when the outside air temperature TA is lower than a reference value (for example, 30° C.) (outside air temperature TA<30° C.). Under the low temperature condition, the controller 7 shortens the interval time TS from the initially set normal time TS1 (for example, 30 minutes) when the coolant temperature TW reaches the first set temperature TW1 (for example, 91° C.) and changes the setting to the reduced time TS2 (for example, 20 minutes). Thereafter, when the coolant temperature TW reaches a low temperature side reference value TW3 (for example, 88° C.) lower than the first set temperature TW1, the controller 7 cancels the setting change of the interval time TS to return from the reduced time TS2 to the normal time TS2.

The table shown in FIG. 3B is selected when the outside air temperature TA exceeds the reference value (30° C.) (outside air temperature TA≥30° C.). Under the high temperature condition, when the coolant temperature TW reaches a second set temperature TW2 (for example, 95° C.) higher than the first set temperature TW1, the controller 7 shortens the interval time TS from the normal time TS1 initialized (30 min) and changes the setting to the reduced time TS2 (20 seconds). Thereafter, when the coolant temperature TW reaches a high temperature side reference value TW4 (for example, 90° C.), the controller 7 cancels the setting change of the interval time TS to return from the reduced time TS2 to the normal time TS1.

In this example, under the low temperature condition where the outside air temperature TA is lower than the reference value, the first set temperature TW1 is specified to be equal to or lower than the coolant temperature (95° C.) at which the thermostat 11 is fully opened. The first set temperature TW1 and the low temperature side reference value TW3 are defined within a temperature range of the coolant water in which the thermostat 11 is fully opened from a fully closed state. Further, under the high temperature condition where the outside air temperature TA is specified to be equal to or higher than the coolant temperature (95° C.) at which the thermostat 11 is fully opened, and the high temperature side reference value TW4 is is specified within the temperature range of the coolant water in which the thermostat 11 is fully opened from the fully closed state at a temperature higher than the low temperature side reference value TW3.

When the interval time TS is set to the normal time TS1, the controller 7 rotates the cooling fan 4 forward for 30 minutes at the L position of the directional control valve 5, and then switches the directional control valve 5 to the M position, and rotates the cooling fan 4 reverse for one minute. Thereafter, the controller 7 switches the directional control valve 5 to the L position and rotates the cooling fan 4 forward for 30 minutes again. The controller 7 repeats the above operation. On the other hand, if the interval time TS is set to the reduced time TS2, the controller 7 rotates the cooling fan 4 at the L position of the directional control valve 5 forward for 20 minutes, and then switches the directional control valve 5 to the M position and rotates the cooling fan 4 reverse for one minute. Thereafter, the controller 7 switches the directional control valve 5 to the L position and rotates the cooling fan 4 forward for 20 minutes. The controller 7 repeats the above operation.

Figure 4:
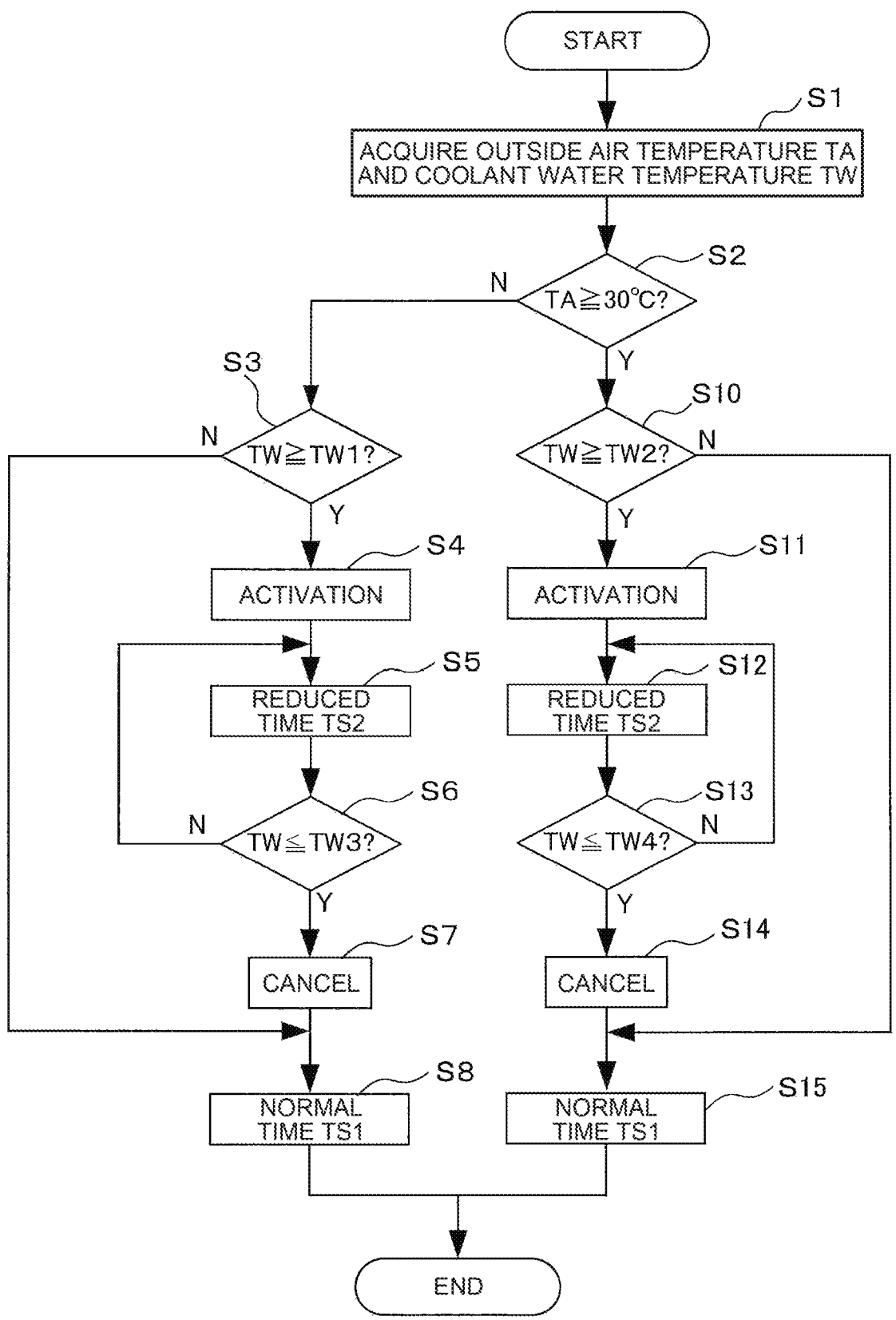
FIG. 4 is a flowchart showing the contents of processing about setting change of time intervals at which the forward and reverse operation of the cooling fan is performed.

The controller 7 controls each part as follows to control the directional control valve 5 that rotates the cooling fan 4 in the forward and reverse directions based on the outside air temperature TA and the coolant temperature TW. FIG. 4 is a flowchart showing the contents of the processing for changing the setting of the interval time TS in which the cooling fan 4 performs forward and reverse rotation operations. When an ignition switch (not shown) of the wheel loader 100 is turned on, a program for performing the process shown in FIG. 4 is started and repeatedly executed by the controller 7.

In Step S1, the controller 7 acquires information on the outside air temperature TA detected from the outside air temperature sensor 17 and information on the coolant temperature TW detected from the coolant temperature sensor 16, and proceeds to Step S2.

In Step S2, the controller 7 determines whether or not the outside air temperature TA detected by the outside air temperature sensor 17 is equal to or higher than a reference value (30° C.). If a negative determination is made in Step S2 (No), that is, under the low temperature condition where the outside air temperature TA is lower than 30° C., the process proceeds to Step S3, and the controller 7 refers to the table shown in FIG. 3A and executes the cooling fan control as will be described below.

First, in Step S3, the controller 7 determines whether or not the coolant temperature TW detected by the coolant temperature sensor 16 is equal to or higher than a first set temperature TW1 (91° C.). If a negative determination is made in Step S3 (No), the process proceeds to Step S8, where the controller 7 repeats the forward and reverse rotations of the cooling fan 4 every preset normal time TS1 (30 minutes) in Step S8. In other words, when the coolant temperature TW of the refrigerant flowing through the radiator 8 does not rise to 91° C., the controller 7 rotates the cooling fan 4 forward for 30 minutes at the L position of the directional control valve 5. Thereafter, the controller 7 switches the directional control valve 5 to the M position to reversely rotate the cooling fan 4 for one minute, and thereafter, switches the directional control valve 5 to the L position to rotate the cooling fan 4 forward for 30 minutes again. The controller 7 repetitively executes the cooling fan control described above.

If the determination in step S3 is affirmative (Yes), that is, if the coolant temperature TW of the refrigerant flowing through the radiator 8 reaches 91° C. or more, the process proceeds to Step S4, and operation of shortening the interval time TS is activated, and the process proceeds to Step S5.

In Step S5, the controller 7 changes the setting of the initialized normal time TS1 (30 minutes) to the reduced time TS2 (20 minutes), and repeats the forward and reverse rotation of the cooling fan 4 every reduced time TS2 to execute the fan control. In other words, after the controller 7 rotates the cooling fan 4 forward for 20 minutes at the L position of the directional control valve 5, the controller 7 switches the directional control valve 5 to the M position to reversely rotate the cooling fan 4 for 1 minute. Then, the controller 7 switches the directional control valve 5 to the L position and rotates the cooling fan 4 forward again for 20 minutes. The controller 7 repeats the above operation. As a result, since the dust is quickly removed by the reverse rotation of the cooling fan 4 before the dust attached to the dustproof filter of the radiator 8 is clogged while the cooling fan 4 is rotating forward, the overheat and so on of the engine 1 caused by the clogging of the radiator 8 can be reliably prevented.

When the fan control for the reduced time TS2 is executed in Step S5, the controller 7 determines in Step S6 whether or not the coolant temperature TW detected by the coolant temperature sensor 16 has become equal to or lower than the low temperature side reference value TW3 (88° C.). If a negative determination (No) is made in Step S6, the process returns to Step S5, and if an affirmative determination (Yes) is made in Step S6, the process proceeds to Step S7.

The controller 7 cancels the setting change of the interval time TS in Step S7 and proceeds to Step S8, and returns from the reduced time TS2 to the normal time TS1 (30 minutes) in Step S8. In other words, when the coolant temperature TW of the refrigerant flowing through the radiator 8 falls to the low temperature side reference value TW3 (88° C.) after the interval time TS has been changed to the reduced time TS2, the controller 7 executes the cooling fan control in which the forward and reverse rotation of the cooling fan 4 is repeated every normal time TS1.

In Step S8, as described above, the controller 7 causes the cooling fan 4 to rotate forward for 30 minutes at the L position of the directional control valve 5, and then switches the directional control valve 5 to the M position and reversely rotates the cooling fan 4 for one minute. Then, the controller 7 switches the directional control valve 5 to the L position to again rotate the cooling fan 4 forward for 30 minutes. The controller 7 executes the cooling fan control described above. As a result, the number of times the cooling fan 4 rotates in the forward and reverse directions within the operating time which has been increased at the time of setting the reduced time TS2 is reduced, and therefore an excessive load on circuit components (the hydraulic motor 3, the directional control valve 5 or the like) caused by the forward and reverse rotations of the cooling fan 4 can be reduced, and the durability of the circuit components can be improved, which also reduces the fuel consumption.

On the other hand, if an affirmative determination is made in Step S2 (Yes), that is, when the outside air temperature TA is the high temperature condition of 30° C. or higher, the process proceeds to Step S10, and the controller 7 executes the cooling fan control to be described below with reference to the table shown in FIG. 3B.

First, in Step S10, the controller 7 determines whether or not the coolant temperature TW detected by the coolant temperature sensor 16 is equal to or higher than a second set temperature TW2 (95° C.). If a negative determination is made in Step S10 (No), the process proceeds to Step S15, where the controller 7 repeats the forward and reverse rotation of the cooling fan 4 every initialized normal time TS1 (30 minutes) in Step S15.

In addition, if the determination in Step S10 is affirmative (Yes), that is, if the coolant temperature TW of the refrigerant flowing through the radiator 8 becomes 95° C. or more, the process proceeds to Step S11 and operates to shorten the interval time TS, and proceeds to Step S12.

In Step S12, the controller 7 changes the setting of the initially set normal time TS1 (30 minutes) to the reduced time TS2 (20 minutes), and performs the forward and reverse rotation of the cooling fan 4 repeatedly at every reduced time TS2 to perform the cooling fan control.

If the cooling fan control of the reduced time TS2 is performed in Step S12, the controller 7 determines whether or not the coolant temperature TW detected by the coolant temperature sensor 16 becomes equal to or lower than a high temperature side reference value TW4 to (90° C.) in Step S13. If a negative determination (No) is made in Step S13, the process returns to Step S12, and if an affirmative determination (Yes) is made in Step S13, the process proceeds to Step S14.

The controller 7 cancels the setting change of the interval time TS in Step S14, proceeds to Step S15, and returns the interval time TS from the reduced time TS2 to the normal time TS1 (30 minutes) in Step S15. In other words, when the coolant temperature TW of the refrigerant flowing through the radiator 8 drops to the high temperature side reference value TW4 (90° C.) after the interval time TS has been changed to the reduced time TS2, the controller 7 executes the cooling fan control in which the forward and reverse rotation of the cooling fan 4 is performed repetitively every normal time TS1.

As described above, in the work vehicle according to the present embodiment, the assumed water temperature (the first set temperature TW1 and the second set temperature TW2) is set based on the cooling performance when the radiator 8 is not clogged in advance. If the actual coolant temperature TW becomes higher than the assumed water temperature, it is determined that a clogged state occurs, and the interval time TS for performing the forward and reverse rotation of the cooling fan 4 is set to be shorter than the time set initially. Therefore, the dust can be properly removed before the radiator 8 is clogged, and the durability of the hydraulic pump 2 or the like configuring the hydraulic circuit can be improved.

Further, multiple conditions when the outside air temperature is low and high are set, and the interval time TS is reduced from the normal time TS1 initially set to the reduced time tS2 under the low temperature condition in which the outside air temperature TA<reference temperature (30° C.) and the coolant temperature TW≥first set temperature TW1 are satisfied. In addition, the interval time TS is reduced from the normal time TS1 initially set to the reduced time tS2 under the high temperature condition in which the outside air temperature TA≥reference temperature and the coolant temperature TW≥second set temperature TW2 are satisfied. The cooling fan 4 can be rotated in the forward and reverse directions at a timing close to the actual clogging state of the radiator 8.

In addition, after the interval time TS is shortened to the reduced time TS2, the coolant temperature TW reaches the low temperature side reference value TW3 lower than the first set temperature TW1, or reaches the high temperature side reference value TW4 lower than the second set temperature TW2, the interval time TS is returned to the initially set normal time TS1, so that an excessive load can be prevented from being applied to the hydraulic motor 3 and the directional control valve 5 that configure the hydraulic circuit. In other words, since the interval time TS is reduced when the radiator 8 approaches the clogging state, and the interval time TS returns to the initial setting when the clogging state of the radiator 8 is released, the number of reverse operations of the cooling fan 4 in the operating time, which has been increased at the time of setting the reduced time TS2, can be reduced, the durability of the circuit components can be improved, and the amount of fuel consumption can be reduced.

In the present embodiment, the first set temperature TW1 and the low temperature side reference value TW3 used in the low temperature condition is defined within the temperature range (85° C.<TW<95° C.) of the coolant water in which the thermostat 11 fully opens from fully closed, and defined to be equal to or higher than the second set temperature TW2 used under the high temperature condition and the temperature of the coolant water at which the thermostat 11 is fully opened. However, the set temperatures of the first set temperature TW1 and the second set temperature TW2 are not necessarily limited to the above embodiment. For example, the second set temperature TW2 may be set to be slightly smaller than the coolant temperature (95° C.) at which the thermostat 11 fully opens.

Further, in the embodiment described above, after the interval time TS is shortened to the reduced time TS2, when the engine is stopped before the coolant temperature TW drops to the low temperature side reference value TW3 or the high temperature side reference value TW4, it is preferable to cancel the setting change of the interval time TS and return the interval time TS to the normal time TS1 of the initial state.

Further, the embodiment described above is an example for describing the present invention and are not intended to limit the scope of the present invention to their implementation forms. Those skilled in the art can implement the present invention in various other aspects without departing from the spirit of the present invention.

REFERENCE SIGNS LIST

1: engine
2: hydraulic pump
3: hydraulic motor
4: cooling fan
5: directional control valve
6: variable relief valve
7: controller (control device)
8: radiator
9: oil cooler
10: accelerator pedal
11: thermostat
12: tank
13: pressure sensor
14, 15: control line
16: coolant temperature sensor (refrigerant temperature sensor)
17: outside air temperature sensor
100: wheel loader (work vehicle)
TA: outside air temperature
TS: interval time
TS1: normal time
TS2: reduced time
TW: coolant temperature (refrigerant temperature)
TW1: first set temperature
TW2: second set temperature
TW3: low temperature side reference value
TW4: high temperature side reference value

The invention claimed is:

1. A work vehicle comprising: an engine; a radiator that cools a refrigerant of the engine; a hydraulic pump that is driven by the engine; a refrigerant temperature sensor that detects a temperature of the refrigerant; an outside air temperature sensor that detects a temperature of an outside air; a thermostat that opens and closes a flowpath between a fully closed state and a fully opened state in accordance with the temperature of the refrigerant on the flowpath for supplying the refrigerant to the radiator; a hydraulic motor which is driven by a pressure oil delivered from the hydraulic pump, and rotates a cooling fan for blowing a cooling air to the radiator; a directional control valve that switches the flow direction of the pressure oil from the hydraulic pump to rotate the hydraulic motor in forward and reverse directions; and a control device that controls the directional control valve to cause the repetitive operation of the forward and reverse rotation of the cooling fan to be performed at predetermined time intervals, wherein the control device changes setting of the time intervals when a relationship between the outside air temperature detected by the outside air temperature sensor and the refrigerant temperature detected by the refrigerant temperature sensor satisfies a predetermined condition defined in advance, the predetermined condition includes a high temperature condition in which the outside air temperature detected by the outside air temperature sensor is higher than a reference value, and a low temperature condition in which the outside air temperature is lower than the reference value, and the control device reduces the time interval more than a normal time initially set when the refrigerant temperature detected from the refrigerant temperature sensor reaches a first set temperature under the low temperature condition or when the refrigerant temperature detected from the refrigerant temperature sensor reaches a second set temperature higher than the first set temperature under the high temperature condition.

2. The work vehicle according to claim 1, wherein the control device returns the time intetrval to the normal time when the refrigerant temperature detected from the refrigerant temperature sensor reaches a low temperature side reference value lower than the first set temperature under the low temperature condition, or when the refrigerant temperature detected from the refrigerant temperature sensor reaches a high temperature side reference value lower than the second set temperature under the high temperature condition, after the time interval is reduced more than the normal time.

3. The work vehicle according to claim 2, wherein the first set temperature and the low temperature side reference value are defined within a temperature range of the refrigerant in which the thermostat fully opens from fully closed.

4. The work vehicle according to claim 2, wherein the second set temperature is equal to or higher than the temperature of the refrigerant at which the thermostat is fully opened.

5. The work vehicle according to claim 1, wherein the control device returns the interval time to the normal time when the engine is stopped after the interval time is reduced more than the normal time.

6. The work vehicle according to claim 3, wherein the second set temperature is equal to or higher than the temperature of the refrigerant at which the thermostat is fully opened.

* * * * *